(12) United States Patent
Chamberlain et al.

(10) Patent No.: US 6,292,611 B1
(45) Date of Patent: Sep. 18, 2001

(54) HIGH FIBER COUNT, COMPACT, LOOSE TUBE OPTICAL FIBER CABLE EMPLOYING RIBBON UNITS AND FLEXIBLE BUFFER TUBES

(75) Inventors: Richard Chamberlain, Surrey (CA); Rodney J. Pierce, Lexington, SC (US); Ben Wells; Roger Vaughn, both of Columbia, SC (US)

(73) Assignee: Pirelli Cables and Systems LLC, Columbia, SC (US)

(*) Notice: Subject to any disclaimer, the term of this patent is extended or adjusted under 35 U.S.C. 154(b) by 0 days.

(21) Appl. No.: 09/687,736

(22) Filed: Jan. 2, 2001

Related U.S. Application Data

(60) Provisional application No. 60/161,089, filed on Oct. 22, 1999.

(51) Int. Cl.$^7$ ........................................... G02B 6/44
(52) U.S. Cl. ..................... 385/114; 385/109; 385/110; 385/112; 385/111; 385/113
(58) Field of Search ........................... 385/100, 109, 385/110, 112, 113, 114, 103, 111

(56) References Cited

U.S. PATENT DOCUMENTS

| | | |
|---|---|---|
| 5,229,851 | 7/1993 | Rahman . |
| 5,531,064 | 7/1996 | Sawano et al. . |
| 5,621,841 | 4/1997 | Field . |
| 5,651,082 | * 7/1997 | Eoll ........................................ 385/114 |
| 5,857,051 | * 1/1999 | Travieso et al. ...................... 385/114 |
| 6,052,502 | * 4/2000 | Coleman ............................... 385/114 |
| 6,185,351 | * 2/2001 | Daneshvar et al. .................. 385/114 |
| 6,195,488 | * 2/2001 | Song ..................................... 385/101 |

OTHER PUBLICATIONS

Reel–Time News (Mar./Apr. 1999) "Loose Tube Ribbon Cable Now Available With Up To 864 Fibers".
Ribbon—Single Jacket Ribbon Loose Tube Fiber Optic Cable (2/98).

* cited by examiner

*Primary Examiner*—Hemang Sanghavi
(74) *Attorney, Agent, or Firm*—L. P. Brooks; Norris, McLaughlin & Marcus

(57) ABSTRACT

An optical fiber cable includes a central strength or structural member, buffer tubes of the desired flexibility are S-Z wound around the central member with a predetermined lay, preferably with alternating single turn S-Z lays and the buffer tubes loosely receive optical fiber ribbon stacks, the pitch of the twist being selected to provide a predetermined ratio of the pitch of the buffer tube lay. The wall thickness of the buffer tubes is selected to provide the desired buffer tube strength and crush resistance, and the diameters of the buffer tubes bores are selected in relation to the size of the optical fiber ribbon stacks so as to provide a predetermined clearance. The clearance C is between about 1 mm and about 2 mm with the relation:

$$C=(T_I^2-W_R^2)^{1/2}-H_R$$

Where $T_I$ is the inner diameter of the tube, $W_R$ is the width of said stack and $H_R$ is a thickness of the stack.

22 Claims, 2 Drawing Sheets

HIGH FIBER COUNT, COMPACT, LOOSE TUBE OPTICAL FIBER CABLE EMPLOYING RIBBON UNITS AND FLEXIBLE BUFFER TUBES

RELATED APPLICATION

Applicants claim the benefit of Provisional Application No. 60/161,089 filed Oct. 22, 1999 in the names of the applicants named in this application.

FIELD OF THE INVENTION

The present invention relates to optical fiber cables having improved flexibility and a high optical fiber count for such a cable of a predetermined diameter and, particularly, to an optical fiber cable with buffer tubes loosely containing helically twisted optical fiber ribbons and S-Z stranded around a central strength or structural member.

BACKGROUND OF THE INVENTION

Optical fiber cables of the type to which the invention relates are well known in the art. See, for example, U.S. Pat. Nos. 5,229,851; 5,531,064 and 5,621,841.

In such cables, there is a central strength or structural member at the axis of the cable around which a plurality of buffer tubes of plastic loosely receiving optical fiber ribbons are wound. The buffer tubes are encircled by one or more layers of plastic and/or metal.

In the optical fiber cable structure heretofore described, the general practice in the prior art was to make buffer tubes from polybutylene terephthalate (PBT), polycarbonate (PC), a layered combination of PBT and PC, or a polyamide such as Nylon-12. These materials are good materials for making buffer tubes because they have high Young's modulus and low thermal expansion coefficients. However, such materials are costly and have low flexibility and moisture sensitivity, and cause difficulty in handling and processing due to the mechanical properties of the materials. For example, PBT has a glass transition temperature of +50° C. and can kink relatively easily during handling, e.g. when bent to a radius less than three inches as may be done in a typical splice enclosure. Thus, it is often necessary to remove the buffer tubes in order to coil the optical fibers. Polypropylene without a copolymer has a glass transition temperature of −15° C.

More recently, polypropylene-polyethylene (PPC) copolymers have been used as buffer tubes to remedy the listed deficiencies of the prior art materials. See, for example, U.S. Pat. No. 5,574,816 which is incorporated herein by reference. High density polyethylene (HDPE) has also been employed as a buffer tube material in the prior art. One especially attractive feature of both HDPE and polypropylene-polyethylene copolymers in buffer tubes is that they are flexible even at low temperature, i.e. below −40° C. HDPE has a glass transition temperature of −76° C., and while polypropylene itself has a glass transition temperature of −15° C., the glass transition temperature of PPC can be lower. However, buffer tubes made from such materials are typically not as strong as the prior art tubes, such as tubes of PBT, and require thicker walls in order to resist crushing pressures or it would be expected that the clearance between the optical fiber ribbon stack and the interior surface of the buffer tube should be increased. Thus, in either event, a larger cable diameter would appear to be necessary for fiber counts comparable to cables with buffer tubes of less flexible materials.

Large fiber count cables are often installed in buried ducts, and therefore, cable diameter is of substantial concern. Cable companies which install optical fiber cables desire the maximum fiber count in the minimum duct size without sacrificing other properties such as flexibility and ease of midspan access.

While it is possible to provide high fiber count optical fiber cables which will have the required diameter when the buffer tube wall can be relatively thin, e.g. the buffer tube is made of a plastic such as PBT which has the undesirable properties set forth hereinbefore, the use of other materials, such as HDPE and polypropylene-polyethylene copolymers (PPC), which have desirable properties, has caused problems in providing an optical fiber count comparable with the fiber count of the prior art for the same cable diameter.

For example, it has been possible with the prior art buffer tube materials to provide an optical fiber cable with 864 optical fibers (6 buffer tubes with a 12 ribbon stack, each ribbon having 12 optical fibers) which can be used in a duct of 1.25 inch diameter. Also, it has been possible to provide an optical fiber cable with 432 (6 buffer tubes with a six ribbon stack, each ribbon having 12 optical fibers) which can be used in a one inch duct. It is desirable that an optical fiber cable with buffer tubes formed from the more flexible plastics have the same fiber counts and fit into such ducts.

It is known in the art that the transmission properties of optical fibers are affected by many factors including the lay length of the buffer tubes, the pitch at which the optical fiber ribbons in the buffer tubes are wound and the ratio of the buffer tube bore diameter to the cross-section of the ribbon stack. See, for example, the above-identified U.S. Pat. Nos. 5,531,064 and 5,621,841 and prior art cited therein.

U.S. Pat. No. 5,531,064 states that it reduces transmission losses when the buffer tube plastic is PBT by controlling the clearance between the ribbon stack and S-Z twisting both the buffer tubes and the ribbon units in a certain relation. For the reason set forth hereinbefore, a buffer tube made by PBT can have a relatively thin wall and for a given cable diameter, a wider choice of clearance can be available than is the case when the buffer tube is made of HDPE or PPC. However, the cable is less flexible, particularly at low temperatures and has other undesirable properties. In addition, manufacturing cost and difficulty is increased by having to S-Z strand the buffer tubes and to S-Z twist the ribbon stack in a predetermined relation.

Another concern for buried optical fiber cables and such cables routed in crowded ducts is the need for such cables to be locatable in order to repair damage or to access optical fibers for routing purposes. Trying to distinguish between similar cables in a duct, or to find the exact cable location in buried earth can be a haphazard task if there is no means for remote identification of the cables. If the incorrect cable is opened, thousand of communications lines may be interrupted, causing great inconvenience to users and substantial financial damage to communications providers.

Communications providers have solved the cable location problem by buying cables with a metallic armor incorporated in the cable under an outer jacket. The metallic armor was used as a conductor for an electrical signal for cable locating purposes. This solution is practical only if the cable application requires armor for moisture or mechanical protection. In applications where armor is not normally employed, the armor makes the cable heavier, bulkier, less flexible, and more expensive.

Other communications providers have run tracer wire inside the ducts used to carry the cables. This practice, however, adds labor to cable installation.

More recently, cable manufacturers have included magnetic particles in the cable construction, such magnetic particles being detectable above ground for a buried cable. See, for example, U.S. Pat. Nos. 5,577,147; 5,305,410; 5,305,411 and 5,636,305. However, the magnetic particles do not have the flexibility that an electrical signal has for distinguishing one cable from another. Further, the magnetic particles are not an inexpensive solution with respect to material costs.

What is needed and is apparently lacking in the art is a small diameter, high fiber count, optical fiber cable with low optical signal attenuation which employs buffer tubes of greater flexibility, particularly at low temperature, and which can also include desirable features known in the art such as "dry" water blocking provisions. It would also be advantageous if such cables in buried ducts were locatable from above ground without substantially increasing cable cost or manufacturing processes.

SUMMARY OF THE INVENTION

We have discovered that an optical fiber cable at least as small in diameter as prior art optical fiber cables and with the same optical fiber count can be constructed with at least as good optical signal transmission properties and having greater flexibility, particularly at temperatures below $-15°$ C., by proper selection of the buffer tube material, ribbon stack clearance in the buffer tube and the ratio of the pitch of the twist of the optical fiber ribbon stack to the lay of the S-Z wound buffer tubes.

The cable of the invention has a central strength or structural member which may or may not have a plastic jacket. Buffer tubes of the desired flexibility are S-Z wound around the central member with a predetermined lay, preferably with alternating single turn S-Z lays, and the buffer tubes loosely receive optical fiber ribbon stacks helically twisted around the axis of the stacks, the pitch of the twist being selected to provide a predetermined ratio of the pitch to the buffer tube lay. The wall thickness of the buffer tubes is selected to provide the desired buffer tube strength and crush resistance, and the diameters of the buffer tube bores are selected in relation to the size of the optical fiber ribbon stacks so as to provide a predetermined clearance.

The desired diameter of the high fiber count cable of the present invention without adversely affecting the optical signal transmission properties is obtained by selecting the clearance between the optical fiber ribbon stack and the flexible buffer tube inner wall, the thickness of the wall of the buffer tubes and by selecting the ribbon pitch, buffer tube lay length to provide a predetermined relationship between the pitch and the lay length. Optionally, a lubricant can be applied to the ribbon stack to further aid in reducing attenuation of optical signals in the optical fibers due to microbending.

There are interstices between the buffer tubes, and optionally, a small gage copper tracer wire is disposed longitudinally in one of the interstices. Alternatively, the tracer wire is embedded in or next to the central structural member. As a further alternative, the tracer wire is embedded in the overall jacket. In each embodiment, an electrical signal can be transmitted along the tracer wire in order to locate the cable using equipment known in the art. The tracer wire can be insulated with a plastic material, such as HDPE, or can be bare and can be made from any conductive material, but preferably, the tracer wire is a copper wire of a size from about 16 AWG to about 24 AWG.

DESCRIPTION OF PREFERRED EMBODIMENTS

Figure 1:
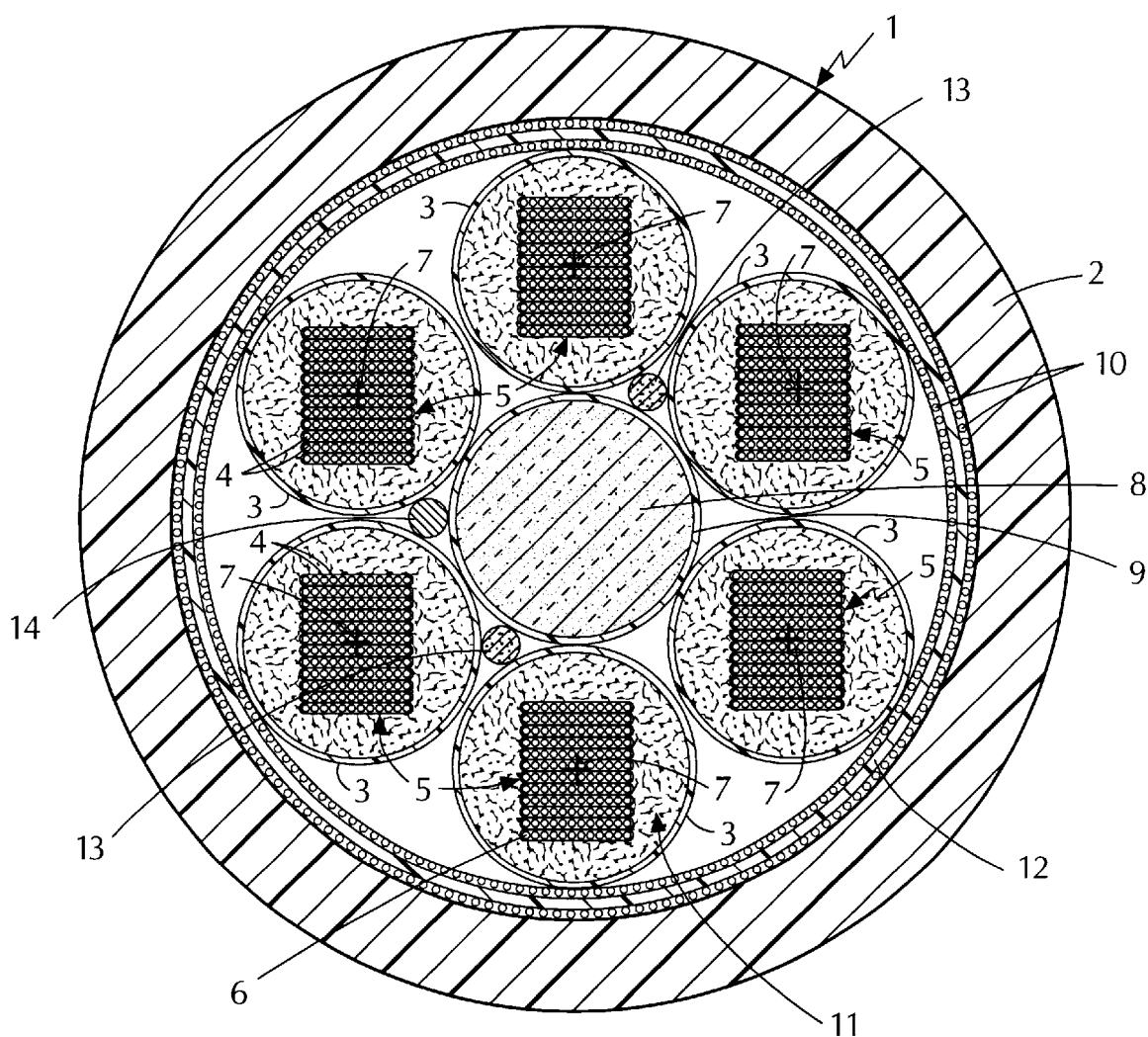
FIG. 1 is a diagrammatic axially transverse cross-sectional view of an embodiment of the optical fiber cable of the invention.

The optical fiber cable of the invention will be described in connection with a cable of the type described in the above-identified U.S. Pat. No. 5,229,851. FIG. 1 illustrates diagrammatically the axially transverse cross-section of a preferred embodiment of the invention.

The cable 1 illustrated in FIG. 1 comprises an outer plastic jacket 2, the plastic of which can be of low density polyethylene (LDPE) or high density polyethylene (HDPE), but preferably, is medium density polyethylene (MDPE). The jacket 2 encircles a plurality of plastic buffer tubes 3, each of which loosely receives a plurality of optical fiber ribbon units superimposed on each other to form stacks 5 of ribbon units 4. The optical fiber ribbon units 4 are conventional and known and comprise a plurality of optical fibers, e.g. fibers 6, in side-by-side relation in a solid non-conductive material, such as a plastic.

FIG. 1 illustrates stacks 5 of twelve ribbon units 4, each containing twelve optical fibers so that there are 144 optical fibers in each buffer tube 3 and 864 optical fibers in the cable 1. The number of ribbon units 4, the number of buffer tubes 3 and the number of optical fibers in the ribbon units 4 can be different from what is shown in FIG. 1. For example, the stacks 5 can have six superimposed ribbon units 4 with twelve optical fibers each providing a cable 1 with 432 optical fibers 6. Also, for example, the stacks 5 can have twelve superimposed, twelve fiber ribbons and eight buffer tubes 3 providing a cable with 1152 optical fibers 6.

Each of the stacks 5 extends longitudinally of the cable 1 and is helically twisted around its axis 7 with a pitch which is determined as set forth hereinafter. Preferably, the axial length of each buffer tube 3 is in the range from about 0.1% greater to about 0.2% less than the axial length of the stack 5 therein.

Each of the buffer tubes 3 is S-Z wound in alternating hand lay around a central strength, or structural, member 8 (CSM) which can have a plastic jacket 9 as is conventional in the art. Preferably, each S turn and each Z turn around the strength member 8 is not greater than a single turn. Because of the S-Z winding of the buffer tubes 3, it can be desirable to hold the tubes 3 in place against the jacket 9 of the strength member 8 by one or more layers of helically wound binder yarns or strings 10 encircling the tubes 3.

The plastic of the buffer tubes 3 is selected so that the buffer tubes 3 are flexible even at low temperatures. As used herein, the term "flexible" means that the plastic of the buffer tubes 3 is such that the buffer tubes 3 have the flexibility of buffer tubes made of HDPE and/or PPC at temperatures as low as $-20°$ C. and, preferably, at least as low as $-40°$ C. Also, the buffer tubes 3 will not break when the tubes 3 are slit to expose optical fibers within a tube 3 at a temperature as low as $-20°$ C. Tubes 3 made from plastics such as PBT or PBT/polycarbonate break or snap when the tubes are at $-20°$ C. and attempts are made to slit such tubes with buffer slitting tools.

The strength member 8 can be of any conventional type, but should provide a cabled tensile strength of at least 600 pounds. The strength member 8 can be metallic, e.g. steel, such as steel rod or stranded steel wires, or all-dielectric, e.g. e-glass rod. As described hereinafter, the strength and stiffness can affect the selection of the stack 5 helical pitch and the buffer tube 3 pitch.

Preferably, the cable 1 includes water blocking material or materials within the jacket 2 for conventional reasons, e.g. to avoid moisture damage to the optical fibers. For example, the buffer tubes 3 can have otherwise empty spaces therein at least partly filled with a water blocking material such as a petroleum jelly, thixotropic gel, or other conventional water blocking materials. The jacket 9 of the strength member 8 can be wrapped with a water swellable tape (not shown) in FIG. 1 and/or the buffer tubes 3 can be encircled by a water swellable tape 12. Alternatively, or in addition, one or more water blocking water swellable yarns 13, can be disposed in interstices between the buffer tubes 3. Alternatively, the otherwise empty spaces between the jacket 2 and the central strength member 8 can have therein water blocking material of the type used in the buffer tubes 3.

We have found that optical fiber cables at least as small in diameter as prior art optical fiber cables and with the same optical fiber count and at least as good optical signal transmission properties can be constructed with buffer tubes of greater flexibility, particularly at temperatures below −15° C., when the ratio of the axial length of the optical ribbon stack 5 to the axial length of the buffer tube 3 is in the range from about 0.1% greater to about 0.2% less and the following conditions are met:

(1) The lay length of the S-Z wound buffer tubes 3 is in the range from about 400 mm to about 600 mm;

(2) The helical pitch of the twist of the ribbon stacks 5 about the axes of the stacks 5 is in the range from about 250 mm to about 1000 mm;

(3) The ratio of the helical pitch of the ribbon stacks 5 to the lay length of the buffer tubes 3 is in the range from about 0.5 to about 1.2;

(4) The clearance C between the ribbon stacks 5 and the inner diameter of the buffer tubes 5 is in the range from about 1 mm to about 2 mm and the relationship conforms to the formula:

$$C=(T_I^2-W_R^2)^{1/2}-H_R$$

where $T_I$ is the inner diameter of the buffer tubes 3, $W_R$ is the width of the stacks 5 and $H_R$ is the thickness of the stacks 5; and (5) The conditions (3) and (4) and the ratio of the axial length of the stacks 5 to the axial length of the buffer tubes 3 are selected so as to provide optical signal attenuation in the optical fibers 6 of less than 0.3 average dB/km at a 1550 nm wavelength or 0.4 average dB/km at a 1310 nm wavelength.

Figure 2:
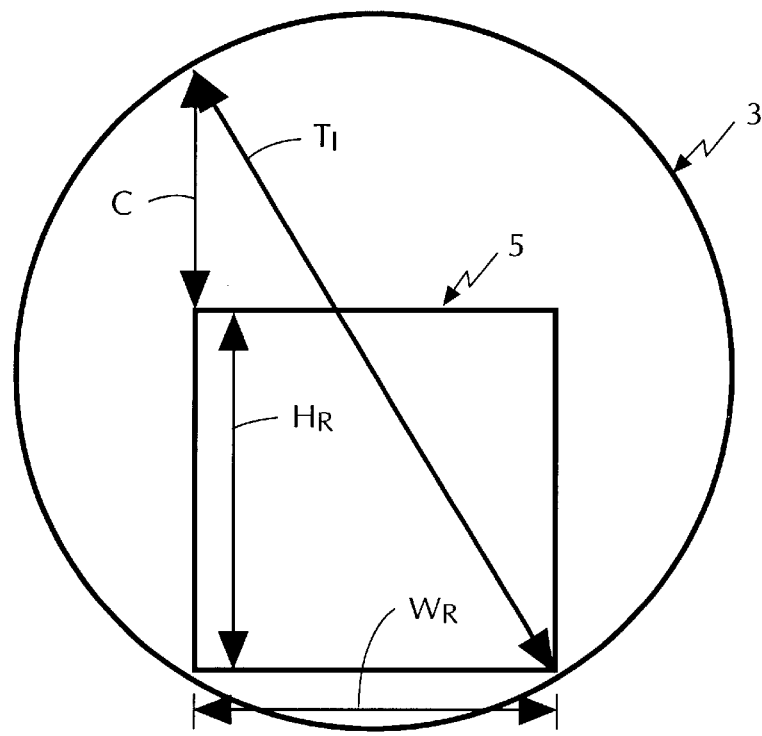
FIG. 2 is a diagram illustrating the dimensions used in calculating the clearance between the inner surface of the wall of a buffer tube of the cable and a stack of optical fiber ribbons.

FIG. 2 is a diagram illustrating the manner in which the measurements are made for determining the clearance C in the formula set forth hereinbefore in condition (4). The thickness of the walls of the tubes 3 can be in the range from about 0.6 mm to about 1 mm.

Preferably, for a cable with 432 optical fibers (stack of six optical ribbons each with twelve optical fiber cables), the range of the ribbon pitch is from about 250 mm to about 450 mm, the range of the tube lay is from about 400 mm to about 600 mm and the range of the ratio of pitch to lay is in the range of about 0.58 to about 0.9 or around 1.2. In a preferred embodiment of a 432 fiber count cable which is suitable for use in a one inch duct, the clearance C is about 1.63 and the thickness of the walls of the buffer tubes 3 is about 0.7 mm. Also, $T_I$ is 4.8 mm, $H_R$ is 1.92 mm and $W_R$ is 3.235 mm.

As mentioned hereinbefore, the ranges for stack 5 pitch and buffer tube 3 lay are affected by the strength and stability of the central strength member 8 which determines the resistance to expansion and contraction of the cable 1. The more stable the strength member 8, the wider the range of acceptable stack pitch and buffer tube lay length. For example, with a CSM designed for a 600 pound load, a ribbon pitch of greater than 450 mm can be unsatisfactory because of high signal attenuation in the optical fibers with field conditions and/or handling of the cable. "Stable" refers to tensile resistance to elongation and compression with respect to temperature change, a more temperature stable material improving the cable performance.

Other factors to be considered in selecting pitch and lay are the manufacturing process and stress relief of the ribbon units 4 when the cable 1 is wound on the drum of a take-up reel. Thus, if the lay of the buffer tube is too short, the manufacturing process is slowed, whereas if the lay is too long, the necessary stress relief for the ribbon units 4 may not be accomplished.

In a preferred embodiment of an 864 fiber count cable which is suitable for use in a one and one quarter inch duct, the clearance C is about 1.33 and the thickness of the walls of the buffer tubes 3 is about 0.85 mm. The acceptable range for the ribbon stack 5 pitch is from about 250 to about 500 mm or 1000 mm and the lay length of the buffer tubes 3 is from about 500 mm to about 600 mm. Also, the $T_I$ is 6.1 mm, $H_R$ is 3.84 mm and $W_R$ is 3.235 mm. Such values are also subject to the considerations set forth hereinbefore.

For some reason not yet determined, pitch to lay ratios at 0.5; 1.0 and 1.5 cause increased signal attenuation values above 0.25, but only a ratio of 1.5 causes a signal attenuation value greater than 0.30. It is preferred that the signal attenuation value be less than 0.25 and more, preferably, less than 0.20, and therefore, selection of parameters within the ranges set forth hereinbefore is desirable to produce the lower attenuation values. However, it is possible that a combination of the selection conditions described hereinbefore may provide the desired attenuation values less than 0.25 even with the 0.5 and 1.0, and possibly, 1.5, pitch to lay ratios.

For the purpose of tracing or locating a cable, as set forth hereinbefore, the cable 1 may include a longitudinally extending electrical conductor 14 in an interstice between the buffer tubes 3 (see FIG. 1). Preferably, the electrical conductor 14 is a wire, such as a copper wire, of a gage size from about 16 AWG to about 24 AWG. Such a wire is discontinuous in the circumferential direction of the strength member 8.

Figure 3:
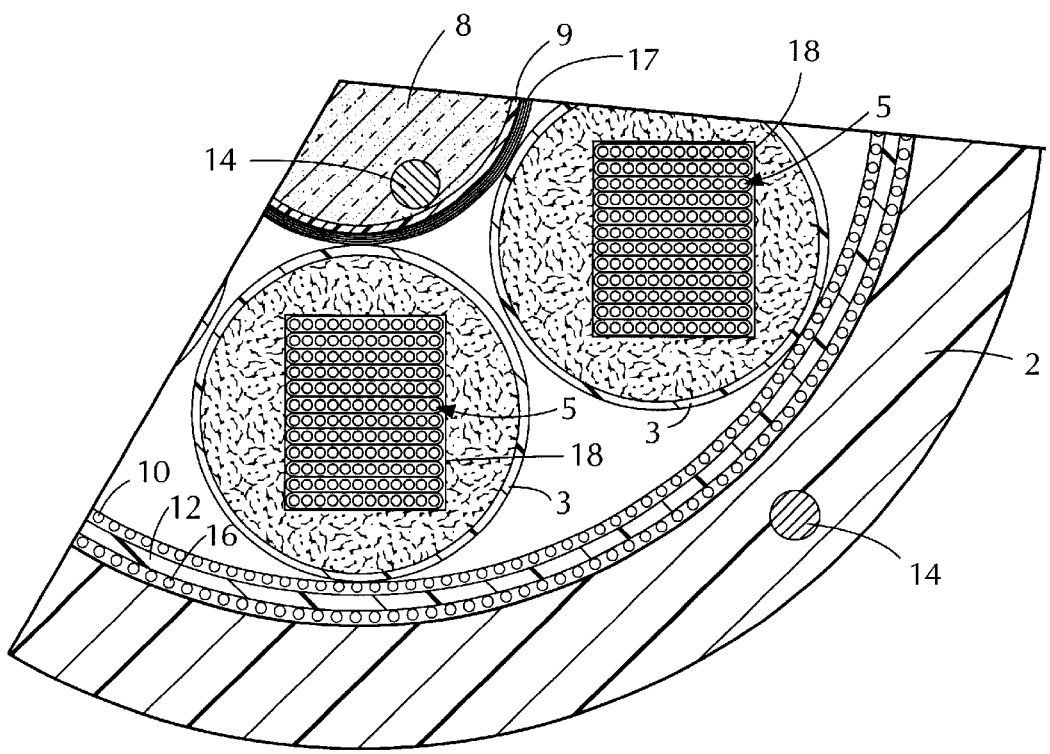
FIG. 3 is a fragmentary cross-section similar to FIG. 1 illustrating modifications of the optical fiber cable shown in FIG. 1.

Alternatively, the conductor 14 may be part of the central strength member 8 or embedded in the outer jacket 2, within its outer surface, as illustrated in FIG. 3.

For the purpose of increasing the tensile strength of the cable 1 without reducing its flexibility, the cable 1 can include a plurality of longitudinal, high tensile strength yarns 16, such as aramid yarns, disposed radially outwardly of the buffer tubes 3, such as between the water swellable tape 12 and the jacket 2 as shown in FIG. 3, or within the outer jacket 2.

FIG. 3 also illustrates an optional layer of water blocking and swellable tape 17 around the central strength member.

If the stacks 5 are not otherwise externally lubricated, such as by the water blocking material within the buffer tubes 3, it has been found that lubrication of the external surfaces of the stacks 5, such as by a layer 18 of a lubricant which can be applied as a silicone mist, can aid in obtaining a low value of signal attenuation for the optical fibers.

Although preferred embodiments of the present invention have been described and illustrated, it will be apparent to those skilled in the art that various modifications may be made without departing from the principles of the invention.

What we claim is:

1. An optical fiber cable comprising:

a longitudinally extending central strength member;

at least one substantially fluid impervious, flexible plastic buffer tube S-Z wound around said central member in an alternating hand helix, said alternating hand helix having a lay length of from about 400 mm to about 600 mm, said tube having an axis and having a wall around the axis with a thickness and an inner and an outer diameter;

a plurality of superimposed ribbon units in a stack loosely received in said tube, each of said ribbon units comprising a plurality of optical fibers held together in side-to-side relation in a non-conductive material, said stack of superimposed ribbon units having a longitudinal axis, having an axial length from about 0.1% greater than the axial length of said tube to about 0.2% less than the axial length of said tube and having a width transverse to the stack axis and a thickness transverse to the stack width; said plurality of ribbon units being helically twisted around the axis of the stack with a pitch of from about 250 mm to about 1000 mm in said tube;

wherein, the ratio of said pitch of said plurality of superimposed ribbon units to said lay length of said tube is from about 0.5 to about 1.2;

wherein there is a clearance C between said plurality of superimposed ribbon units and the inner diameter of said tube wall is between about 1 mm and about 2 mm with the relation;

$$C = (T_I^2 - W_R^2)^{1/2} - H_R$$

where $T_I$ is the inner diameter of said tube, $W_R$ is the width of said stack and $H_R$ is a thickness of said stack;

a sheath of plastic material encircling said central strength member and said tube wound around said central member; and wherein said ratio of said ribbon pitch to said tube lay length, said clearance and said axial length of said stack are selected to provide optical signal attenuation in the optical fibers of less than 0.30 average dB/km at a 1550 nm wavelength.

2. An optical fiber cable as set forth in claim 1 wherein the plastic of the buffer tube is flexible and does not break when slit at temperatures as low as −20° C.

3. An optical fiber cable as set forth in claim 2 wherein the plastic is selected from the group of plastics consisting of high density polyethylene and polypropylene-polyethylene copolymers.

4. An optical fiber cable as set forth in claim 1 wherein each S twist and each Z twist of the buffer tube does not exceed one turn.

5. An optical fiber cable as set forth in claim 1 wherein the pitch of the twist of the ribbon units is from about 300 mm to about 400 mm, the ratio of the pitch to the lay length of the buffer tube is from about 0.5 to about 0.9 and the clearance between the plurality of superimposed ribbon units and the inner diameter of the buffer tube is from about 1.0 mm to about 1.5 mm.

6. An optical fiber cable as set forth in claim 5 further comprising a water blocking material in at least some of otherwise empty spaces within said sheath.

7. An optical fiber cable as set forth in claim 6 wherein the water blocking material is in otherwise empty spaces within the buffer tube and permits the ribbon unit to move with respect to the buffer tube.

8. An optical fiber cable as set forth in claim 7 wherein the water blocking material is a gel.

9. An optical fiber cable as set forth in claim 6 wherein the water blocking material is in otherwise empty spaces between the sheath and the central strength member and permits the buffer tube to move with respect to the sheath.

10. An optical fiber cable as set forth in claim 5 further comprising a water swellable tape encircling the central strength member.

11. An optical fiber cable as set forth in claim 10 wherein the water swellable tape is intermediate the sheath and the buffer tube.

12. An optical fiber cable as set forth in claim 1 further comprising a plurality of flexible, high tensile strength yarns intermediate the sheath and the buffer tube.

13. An optical fiber cable as set forth in claim 1 further comprising a lubricant intermediate the ribbon units and the buffer tube.

14. An optical fiber cable as set forth in claim 13 wherein the lubricant comprises silicone.

15. An optical fiber cable as set forth in claim 1 further comprising a plastic jacket encircling the central strength member and intermediate the central strength member and the buffer tube.

16. An optical fiber cable as set forth in claim 1 wherein the sheath has an outer surface and further comprising a longitudinally extending, electrically conductive element in said cable and within the outer surface of the sheath, said element being circumferentially discontinuous circumferentially of the strength member.

17. An optical fiber cable as set forth in claim 16 wherein the electrically conductive element is a wire.

18. An optical fiber cable as set forth in claim 17 wherein the electrically conductive element is insulated and has a gage size from about 16 AWG to about 24 AWG.

19. An optical fiber cable as set forth in claim 16 wherein the electrically conductive element is within the central strength member.

20. An optical fiber cable as set forth in claim 16 wherein the electrically conductive element is embedded in the sheath.

21. An optical fiber cable as set forth in claim 16 wherein the electrically conductive element is intermediate the sheath and the central strength member.

22. An optical fiber cable as set forth in claim 1 wherein the central strength member has a tensile strength of at least 600 pounds.

* * * * *

UNITED STATES PATENT AND TRADEMARK OFFICE
CERTIFICATE OF CORRECTION

PATENT NO.    : 6,292,611 B1
DATED         : September 18, 2001
INVENTOR(S)   : Chamberlain et al.

Page 1 of 1

It is certified that error appears in the above-identified patent and that said Letters Patent is hereby corrected as shown below:

<u>Title page,</u>
Item [22], File: "Jan. 2, 2001" should read -- October 13, 2000 --

<u>Column 6,</u>
Line 59, "yams" should read -- yarns --

<u>Column 8,</u>
Line 27, "yams" should read -- yarns --

Signed and Sealed this

Ninth Day of April, 2002

Attest:

Attesting Officer

JAMES E. ROGAN
Director of the United States Patent and Trademark Office